(12) United States Patent
Hashizume et al.

(10) Patent No.: US 7,729,090 B2
(45) Date of Patent: Jun. 1, 2010

(54) DISK DRIVE DEVICE, ACTUATOR LOCK MECHANISM, INERTIA LATCH MECHANISM AND INERTIA LEVER

(75) Inventors: Masataka Hashizume, Kanagawa-ken (JP); Shinichi Kimura, Kanagawa-ken (JP); Kohji Takahashi, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1462 days.

(21) Appl. No.: 10/321,937

(22) Filed: Dec. 17, 2002

(65) Prior Publication Data

US 2003/0147179 A1 Aug. 7, 2003

(30) Foreign Application Priority Data

Feb. 1, 2002 (JP) ............................. 2002-025925

(51) Int. Cl.
G11B 5/54 (2006.01)
(52) U.S. Cl. .................................................. 360/256.4
(58) Field of Classification Search ............... 360/256.4
See application file for complete search history.

(56) References Cited

U.S. PATENT DOCUMENTS

| 6,163,440 | A | 12/2000 | Takahashi et al. | |
| 6,624,980 | B1 * | 9/2003 | Watson et al. | 360/256.4 |
| 6,680,822 | B1 * | 1/2004 | Lin et al. | 360/256.4 |

* cited by examiner

*Primary Examiner*—David D Davis

(57) ABSTRACT

Disclosed is an inertia latch mechanism capable of omitting erection of a pin for swinging an inertia lever. An inertia lever for use in the inertia latch mechanism is constituted of: a lever body swinging by inertia when an impact is applied thereto; a fixture fixed to a case of a disk drive device; and a plate spring member for connecting the lever body and the fixture and permitting swing of the lever body.

11 Claims, 8 Drawing Sheets

DISK DRIVE DEVICE, ACTUATOR LOCK MECHANISM, INERTIA LATCH MECHANISM AND INERTIA LEVER

RELATED PATENT APPLICATION

This application claims the priority of Japanese Patent No. JP2002-025925, filed on Feb. 1, 2002, and entitled "Disk Drive Device, Actuator Lock Mechanism, Inertia Latch Mechanism and Inertia Lever".

BACKGROUND OF THE INVENTION

1. Technical Field

The present invention relates to an inertia latch mechanism for latching an actuator of a disk drive device when an impact is applied from the outside to the disk drive device, and more particularly, to an installation structure of an inertia lever for use in the inertia latch mechanism.

2. Description of the Related Art

In the disk drive device in recent years, for the purpose of preventing sticking of a head slider to a surface of a disk and enhancing a reliability for an impact applied thereto, a load/unload mechanism for the head slider has been employed. During nonoperation of the disk drive device, the load/unload mechanism allows a part called a ramp, which is provided in the vicinity of an outer circumference of a disk, to hold an actuator, and thus allows the head slider to be escaped in no contact with a disk surface.

Meanwhile, in a disk drive device mounted on a portable personal computer (PC) of a notebook type or the like, a high reliability for the impact during non-operation has been required. During the non-operation of the disk drive device, if the head slider mounted on the actuator moves (pops out) from an escape position to a data area on the disk surface by the impact, then the head slider is stuck to the surface of the data area, or damages the surface of the data, resulting in a fatal failure. In order to obtain a high reliability for the impact during the non-operation, it is important to hold the actuator in the escape position and to prevent the actuator from swinging and moving to the surface of the data area by the impact during the non-operation.

The same can be said for the disk drive device using the load/unload mechanism. For an impact at a relatively low level, the ramp can prevent the head slider from popping out (loading). Specifically, the ramp constitutes a lock mechanism of the actuator for driving the head slider. However, for a large impact, it is difficult for only the lock mechanism formed of the ramp to prevent the actuator from popping out. Therefore, in many cases, besides the ramp, the disk drive device has an inertia latch mechanism provided therein.

The inertia latch mechanism operates when an impact is applied to the disk drive device. This latch mechanism is a mechanism for latching the actuator by use of inertia force generated by the applied impact. The inertia latch mechanism has a feature capable of latching the actuator for the strong impact.

For example, in the gazette of Japanese Patent Laid-Open No. Hei 10 (1998)-302418 (Japanese Patent No. 3077897, U.S. Pat. No. 6,163,440) by the applicants of the present application, an inertia latch mechanism is described. This inertia latch mechanism is basically constituted of a latch lever and an inertia lever in which an inertial moment is larger than that of the latch lever. When an impact swinging the actuator in a first direction is applied, this inertia lever swings to the first direction, engages with the latch lever at a first engaging portion, moves the latch lever to an actuator latching position, and allows the actuator to be latched. Moreover, when an impact swinging the actuator in a second direction is applied, the inertia lever swings to the second direction, engages with the latch lever at a second engaging portion, moves the latch lever to the actuator latching position, and allows the actuator to be latched.

As described above, the inertia lever performs a swing motion. In the conventional disk drive device, a pin erected in a case thereof has been set as a swing shaft.

However, work of erecting a pin as this swing shaft is not easy. Particularly, in a small size disk drive device mounted on the portable PC, since the pin itself is in small diameter, workability therefor is poor, and a position of erecting the pin must be determined with high accuracy. Once the pin is erected, correction cannot be made therefor. Meanwhile, in the inertia lever, a through hole for inserting the erected pin therethrough is drilled, and high accuracy is required for this through hole. For the reasons as described above, the inertia latch mechanism has hindered reduction in fabrication cost of the hard disk drive.

SUMMARY OF THE INVENTION

An object of the present invention is to provide an inertia latch mechanism capable of omitting erection of the pin for swinging the inertia lever. Another object of the present invention is to provide a disk drive device or an actuator lock mechanism, which includes the inertia latch mechanism as described above. Still another object of the present invention is to provide an inertia lever usable for the inertia latch mechanism as described above.

The present invention is applied to a disk drive device comprising: a disk-shaped recording medium; a head slider including a head element for recording data in the disk-shaped recording medium and reading the recorded data; an actuator including a head arm having the head slider mounted thereon, the actuator being for unloading the head arm to an escape position and loading the head arm from the escape position so that the head slider is disposed close to a surface of the disk-shaped recording medium; and an inertia latch mechanism for latching and stopping the actuator in the escape position when an impact is applied thereto in a state where the actuator is located in the escape position.

Moreover, the inertia latch mechanism in the present invention includes: a latch member capable of swinging between a release position of the actuator and a latching position of the actuator around a specified swing shaft, the latch member moving from the release position of the actuator to the latching position thereof to latch the actuator when the impact is applied thereto; and an inertia member swinging by inertial force of the impact to move the latch member when the impact is applied thereto. Furthermore, the inertia latch mechanism in the present invention includes: a fixed member fixed at a specified position of the disk drive device; and a swing permitting member permitting the swing of the inertia member, the swing permitting member being interposed between the fixed member and the inertia member.

The inertia latch mechanism in the present invention employs a structure, in which the fixed member fixed to the specified position of the disk drive device is provided, and the swing permitting member is disposed between the fixed member and the inertia member. These fixed member, inertia member and swing permitting member can be monolithically constituted before being assembled in the disk drive device. Moreover, since these members can be fixed to the disk drive device after the fixed member is properly positioned, specified accuracy can be secured. Naturally, in this process, high accuracy work of erecting a pin is not required As a typical example of the swing permission member described above, an elastic member can be given. Accordingly, the present invention provides an inertia latch mechanism for use in a disk drive device including the latch member, the elastic member and the inertia member. Around the specified swing shaft, this latch member can swing between the actuator release position and the actuator latching position. When an impact is applied to the latch member, the latch member moves from the actuator release position to the actuator latching position, and latches the actuator. Moreover, for the elastic member, flexure to a swing direction of the latch member is permitted, but flexure to a direction perpendicular to the swing direction is substantially limited. Furthermore, the inertia member can swing in connection to the elastic member, and when the impact is applied thereto, the inertia member performs a swing motion by inertial force thereof to move the latch member.

Here, the conventional inertia latch mechanism has employed a structure of rotatably supporting the inertia member on the pin. Therefore, it is supposed that the inertia member moves in a vertical direction by vibrations applied thereto and collides with a case of the disk drive device. There has been a possibility that this collision causes contamination. On the contrary, in the disk drive device according to the present invention, for the inertia member, flexure to the swing direction in the latch member is permitted, but the inertia member is connected to the elastic member in which the flexure to the direction perpendicular to the swing direction is substantially limited. Therefore, the vibration of the inertia member in the vertical direction is limited. Accordingly, the collision of the inertia member with the case of the disk drive device can be suppressed.

In the disk drive device of the present invention, a configuration can be made, in which the elastic member is connected to a fixture in which movement to the disk drive device is restricted, and the inertia member is connected to this elastic member. Here, the elastic member itself is formed into a specified shape, and thus the elastic member can be fixed and restricted to the case of the disk drive device. However, from the viewpoint of manufacturability, it is more desirable that a configuration be made, in which a fixture is prepared, and the elastic member is connected to this fixture.

The form of the elastic member in the present invention is not particularly limited. However, in order to satisfy the requirement that the flexure to the direction perpendicular to the swing direction be substantially limited while the flexure to the swing direction in the latch member is permitted, it is desirable to use a plate spring. The plate spring may be used singly or in plural.

Note that, as described in an embodiment to be described later, structures of the latch member and the inertia member are determined, and thus the inertia member can restrict the movement of the latch member to the direction perpendicular to the swing direction.

If a regulating member is provided, which permits the swing of the inertia member, and more specifically, the inertia lever, but regulates the operation of the inertia lever to directions other than the swing direction, then the vibrations of the inertia member in the vertical direction can be limited. It is needless to say that this concept can be applied to an actuator lock mechanism comprising: an inertia latch mechanism for latching and stopping a rotary actuator in an escape position when an impact is applied thereto in a state where the rotary actuator is located in the escape position; and an actuator holding mechanism for holding the rotary actuator in the escape position for an impact insufficient for the latching by the inertia latch mechanism. Then, this inertia latch mechanism will include: an inertia lever swinging by receiving inertial force by the impact; a latch lever for latching and stopping the rotary actuator in the escape position accompanied with an operation of the inertia member; and a regulating member for permitting swing of the inertia lever but regulating the operation of the inertia lever to directions other than the swing direction.

The regulating member in the present invention can be constituted of a plate-shaped body disposed so that rigidity thereof in the swing direction can become larger than rigidity thereof in a direction perpendicular to the swing direction. As one example of this plate-shaped body, the above-described plate spring can be given.

Configurations of the latch lever and inertia lever, to which the present invention is desirably applied, will be described as below. The latch lever can swing around a specified swing shaft, and has first and second points of application, which are disposed to bridge the swing shaft. Moreover, the inertia lever has third and fourth points of application, which are disposed to bridge the swing shaft of the latch lever. When the third point of application of the inertia lever contacts the first point of application of the latch lever, and first external force acts on the first point of application, the latch lever swings to a specified direction. Moreover, when the fourth point of application of the inertia lever contacts the second point of application of the latch lever, and second external force acts on the second point of application, the latch lever swings to the specified direction.

As described above, a novel point of the present invention can be found in that the swing operation of the inertia lever is controlled by spring force. Accordingly, the present invention is an inertia latch mechanism disposed in a case of a disk drive device, in which a rotary actuator is latched and stopped in an escape position when an impact is applied thereto in a state where the rotary actuator is located in the escape position, the inertia latch mechanism comprising: an inertia lever swinging by receiving specified inertial force by the impact; and a latch lever for latching and stopping the rotary actuator in the escape position in a process of swinging around a swing shaft accompanied with an operation of the inertia lever, wherein a swing operation of the inertia lever is controlled by spring force. Furthermore, the inertia lever has two points of application, which are disposed spaced from each other by a specified interval, and the latch lever has a first surface facing to the rotary actuator and a second surface opposite to the first surface. One of the points of application of the inertia lever acts on the first surface of the latch lever, and thus the latch lever swings to a specified direction. Moreover, the other of the points of application of the inertia lever acts on the second surface of the latch lever, and thus the latch lever also swings to the specified direction.

It is desirable that the inertia latch mechanism according to the present invention be provided with a plate spring disposed to be bent solely in a direction of the swing operation of the inertia lever, the inertia lever is connected to the plate spring, and thus the swing operation of the inertia lever is controlled. In this case, the plate spring keeps a straight state when the impact is not applied thereto to maintain the inertia lever at a specified position. This is for regulating free swing independent of the impact to the inertia lever. However, when an impact is applied, the plate spring is bent to permit the swing of the inertia lever.

As apparent from the foregoing explanation, the effect of the inertia latch mechanism provided according to the present invention is brought by the characteristic inertia lever.

Accordingly, the present invention provides inertia lever disposed in a case of a disk drive device and used for an inertia latch mechanism for latching and stopping a rotary actuator in an escape position when an impact is applied thereto in a state where the rotary actuator is located in the escape position, the inertia lever comprising: a lever body swinging by inertia of the impact when the impact is applied thereto; a fixture fixed to the case; and a swing permitting member for connecting the lever body and the fixture and permitting the swing of the lever body.

In the inertia lever of the present invention, it is desirable that the swing permitting member be constituted of a plate spring member. Then, it is desirable that the plate spring member include: a spring body having a portion bent during the swing of the lever body; a first connection portion continuous with the spring body and for connecting the spring body to the lever body; and a second connection portion continuous with the spring body and for connecting the spring body and the fixture. This is for convenience of connection of to plate spring member to the lever body and the fixture. The first and second connection portions may be either monolithic with or separate from the spring body. For the connection, if first and second engaging portions are formed in the lever body and the fixture, respectively, then the first connection portion of the plate spring member engages with the first engaging portion, and the second connection portion of the plate spring member engages with the second engaging portion, and thus the lever body and the fixture can be readily connected by the plate spring member. The first and second engaging portions are a conception including various forms such as grooves and through holes.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF A PREFERRED EMBODIMENT

Hereinafter, description will be made in detail for the present invention based on an embodiment.

Figure 1:
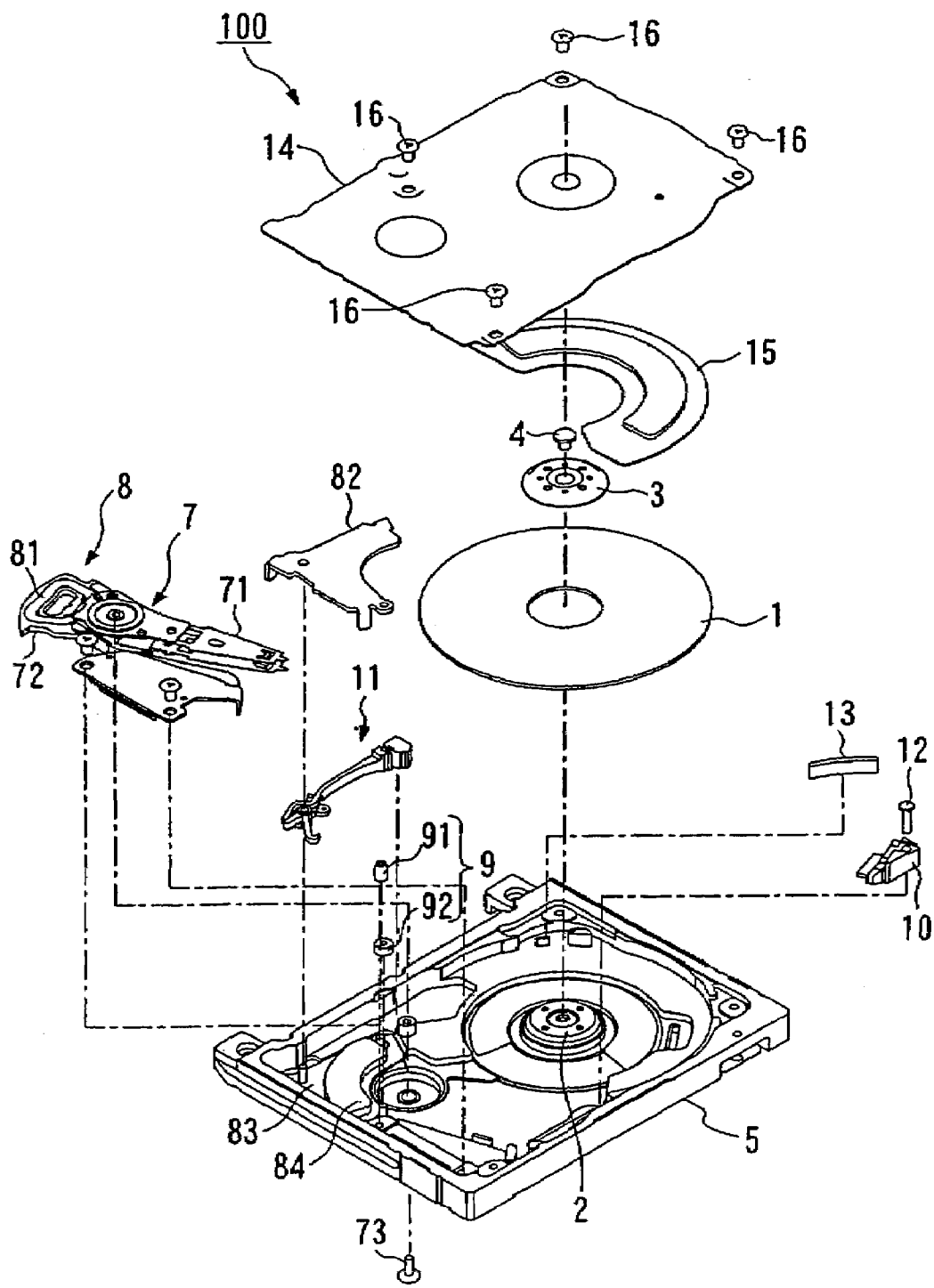
FIG. 1 is an exploded perspective view showing a configuration of a hard disk drive according to an embodiment of the present invention.
Figure 2:
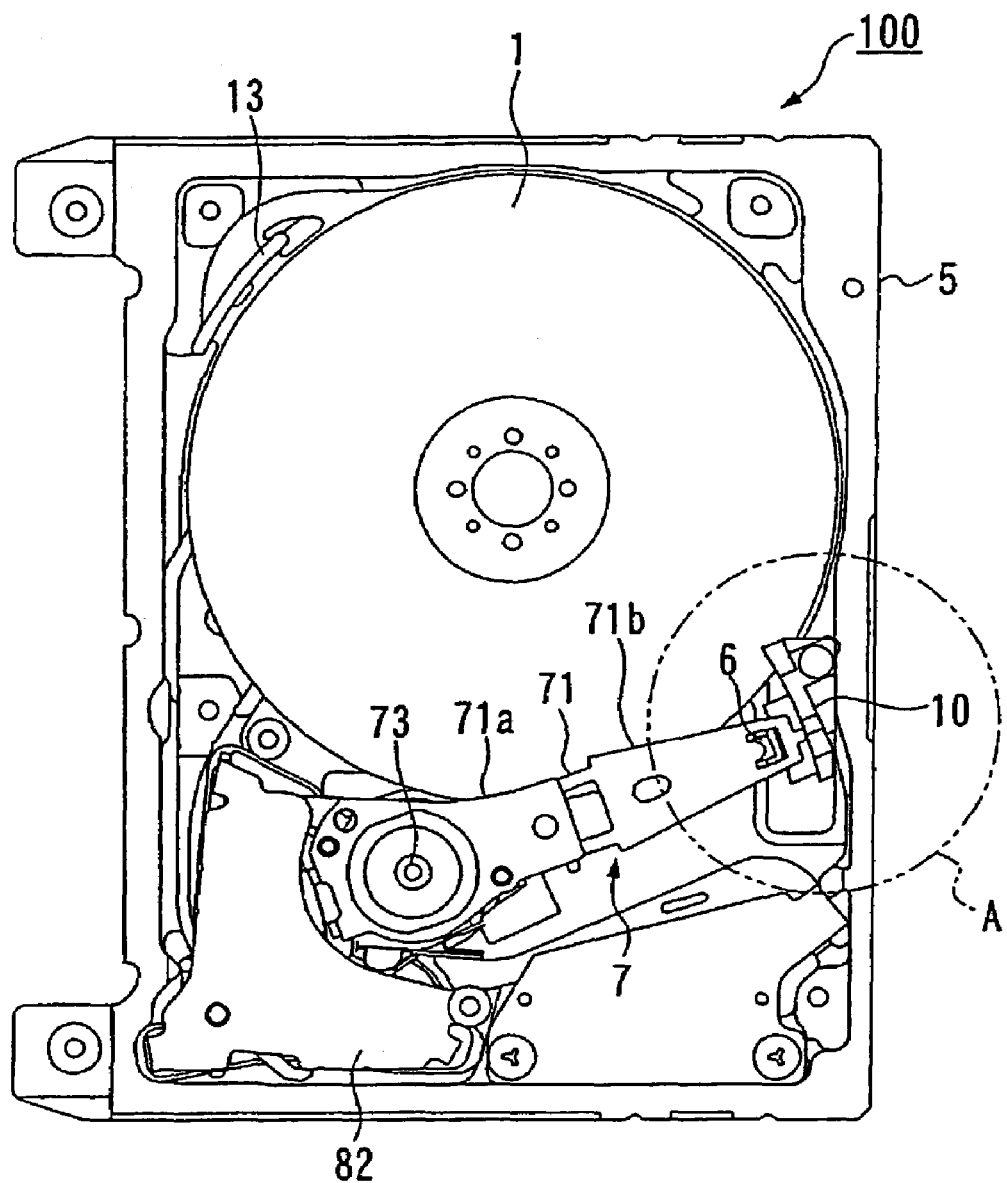
FIG. 2 is a plan view showing the configuration of the hard disk drive according to the embodiment.
Figure 3:
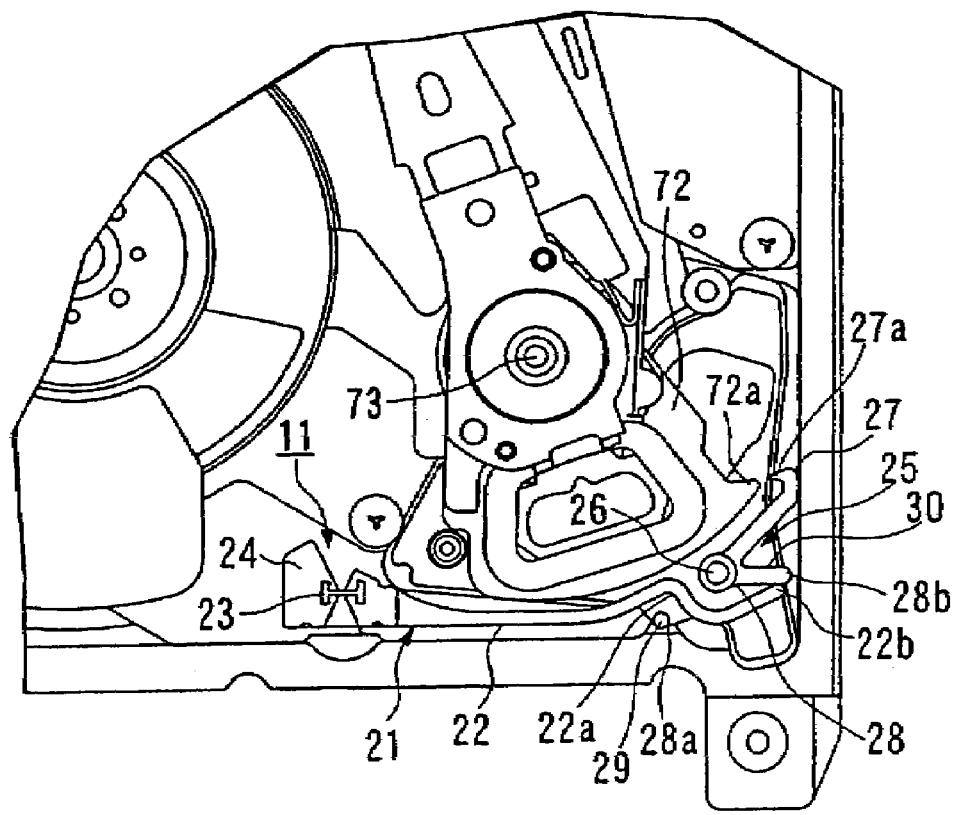
FIG. 3 is a partially enlarged view of FIG. 2.

FIG. 1 is an exploded perspective view of a hard disk drive 100 as a disk drive device according to the embodiment of the present invention, FIG. 2 is a plan view of the hard disk drive 100, and FIG. 3 is an enlarged view of a portion A of FIG. 2. Note that FIG. 2 shows a state where a top cover 14 of the hard disk drive 100 is removed.

In FIGS. 1 to 3, in a box-shaped base 5, there are accommodated a magnetic disk 1 as a data recording medium, a spindle motor 2 for rotatively driving the magnetic disk 1, an actuator 7 having head sliders 6 mounted thereon, a voice coil motor (VCM) 8 for swingingly driving the actuator 7, a crush stop 9 for regulating a swing range of the actuator 7, a ramp block 10 provided in an escape position for the actuator 7, an inertia latch mechanism 11 of the present invention, which constitutes an actuator lock mechanism, and the like. This hard disk drive 100 is provided with a load/unload mechanism for the actuator 7 and an actuator lock mechanism using the inertia latch mechanism 11, which are for unloading the actuator 7 to the escape position when the operation of the hard disk drive 100 is stopped and for holding the actuator 7 in the escape position during non-operation of the hard disk drive 100. The ramp block 10 constitutes the above-described load/unload mechanism and actuator lock mechanism.

The magnetic disk 1 is fixed to a rotor portion of the spindle motor 2 by a top clamp 3 and a screw 4. The magnetic disk 1 is rotatively driven around a spindle shaft of the spindle motor 2 during the operation of the hard disk drive 100, and stopped to be still during the non-operation of the hard disk drive 100. On the surface of the magnetic disk 1, tracks are disposed in a concentric circle shape, on which data and servo information are recorded. While one piece of the magnetic disk 1 is mounted in this embodiment, two or more pieces may be mounted.

The actuator 7 has a head arm 71 and a coil arm 72, and engages with a swing shaft 73 so as to freely swing. Accordingly, the actuator 7 is provided so as to rotatably move around the swing shaft 73. The head arm 71 and the coil arm 72 are disposed so as to be opposite to each other sandwiching the swing shaft 73. As shown in FIG. 2, the head arm 71 has a carriage arm 71*a* and a suspension arm 71*b* suspended on this carriage arm 71*a*. As shown in FIG. 3, the suspension arm 71*b* has a tab 74 for escaping the head arm 71 in the ramp block 10. The tab 74 is a portion held by the ramp block 10 when the head arm 71 moves to the escape position. Moreover, on the suspension arm 71*b*, the head sliders 6 are mounted. The head arm 71 is formed in plural in a comb shape.

The head sliders 6 are attached to the head arm 71 so as to face the upper and lower surfaces of the magnetic disk 1, respectively, and are connected to a control unit by wire wiring and the like (not shown). Each of the head slides 6 includes head elements (not shown) for recording data from the control unit in the tracks on the surface of the magnetic disk 1 and reading the data recorded in the tracks to send the data to the control unit.

The VCM 8 is constituted of a voice coil 81 mounted on the inner surface of the coil arm 72, upper yoke 82, lower yoke 83, a permanent magnet (not shown) attached on the lower surface of the upper yoke 82, and a permanent magnet 84 attached on the upper surface of the lower yoke 83 and the like. To the voice coil 81, a drive current is supplied from the unillustrated control unit. The coil arm 72 is disposed in a space sandwiched by the upper yoke 82 and the lower yoke 83.

The crush stop 9 is provided for forcibly stopping the swing of the actuator 7 by abutting on the coil arm 72 and for preventing collision of the actuator 7 with the spindle motor 2 and other device composing mechanisms when the VCM 8 runs away during the operation. The crush stop 9 is constituted of a pair of pins 91 and 92.

The ramp block 10 is fixed to the base 5 by a screw 12. Note that the actuator 7, the VCM 8 and the ramp block 10 constitute the load/unload mechanism.

In the base 5, there is disposed a circulation filter 13 for filtering the air circulating in the hard disk drive 100. Then, the top cover 14 having a breather filter 15 attached thereto is fastened by screws 16, and thus the inside of the base 5 is hermetically sealed from the outside.

Figure 4:
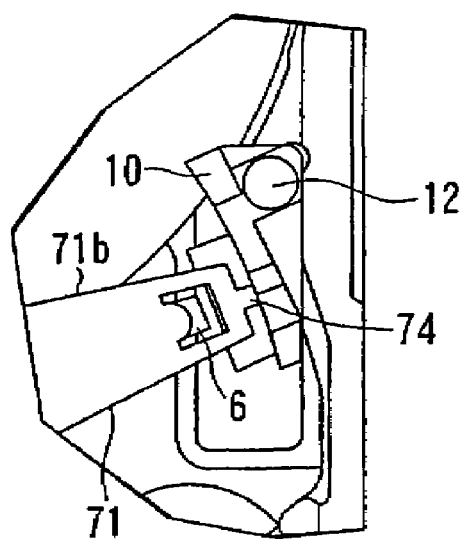
FIG. 4 is a partial plan view showing a vicinity of an inertia latch mechanism of the hard disk drive according to the embodiment, showing a state where an impact is not applied.
Figure 7:
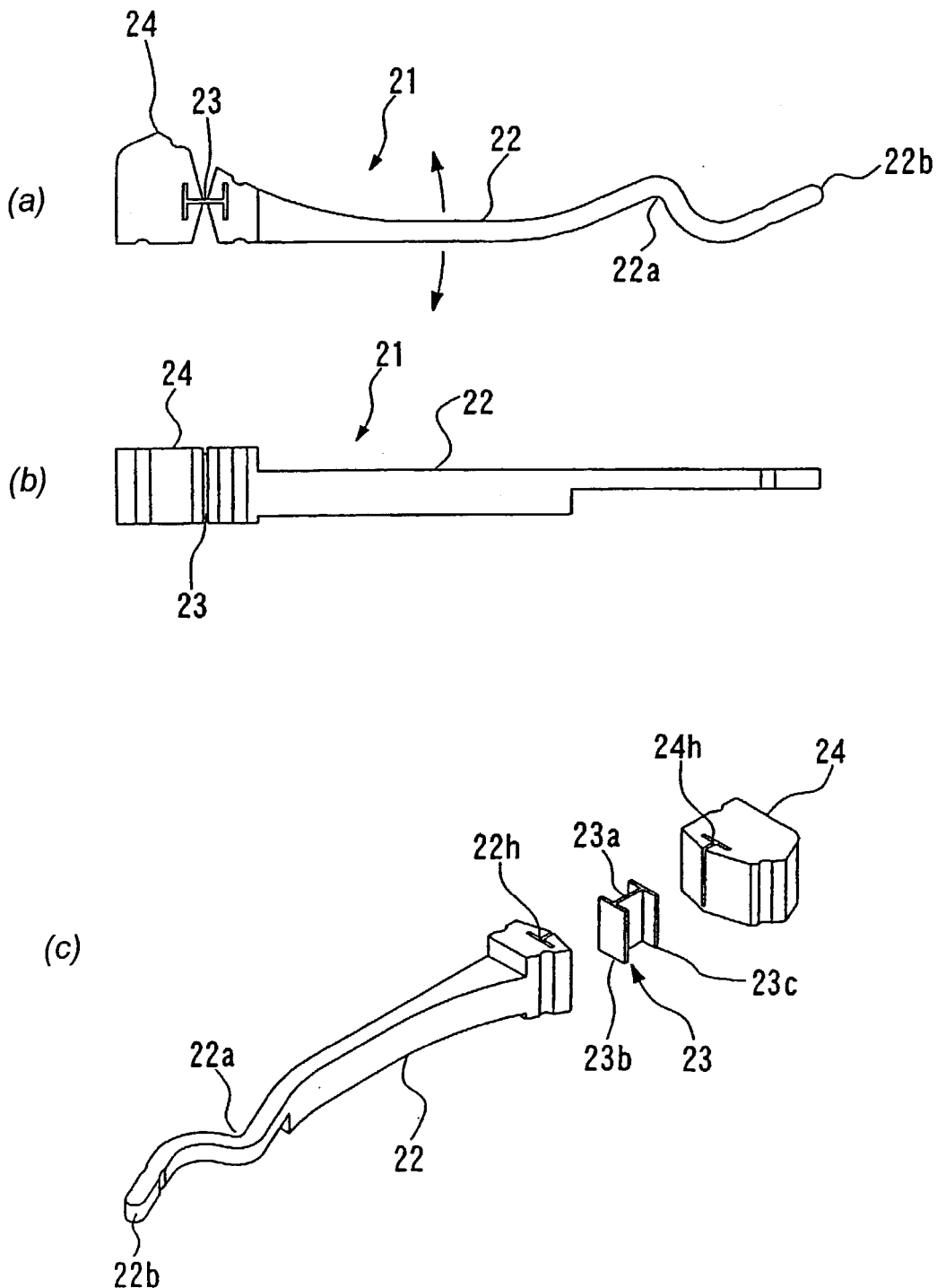
FIGS. 7(*a*), (*b*), and (*c*) are plan, side, and exploded perspective views, respectively, showing a form of the inertia lever for use in the hard disk drive according to this embodiment.

FIG. 4 is an enlarged view of a peripheral portion of the inertia latch mechanism 11 in FIG. 1, and FIG. 7 is a view showing an inertia lever 21 constituting the inertia latch mechanism 11. In FIGS. 1, 4 and 7, the inertia latch mechanism 11 is constituted of the inertia lever 21, which is composed of a lever body 22, a plate spring member 23 and a fixture 24, and a latch lever 25 capable of swinging (rotatively moving) around the swing shaft 26.

As shown in FIGS. 7(*a*), (*b*), and (*c*), the inertia lever 21 is constituted of three members, that is, the lever body 22, the plate spring member 23 and the fixture 24. The lever body 22 is provided with two points of application 22*a* (third point of application) and 22*b* (fourth point of application). As shown in FIG. 4, the two points of application 22*a* (third point of application) and 22*b* (fourth point of application) are disposed bridging the swing shaft 26 of the latch lever 25. The fixture 24 is fixed to the base 5. In the lever body 22, a T-shaped engaging groove 22*h* is formed, with which a first connection portion 23*b* of the plate spring member 23 is engaged. In the fixture 24, a T-shaped engaging groove 24*h* is formed, with which a second connection portion 23*c* of the plate spring member 23 is engaged.

The plate spring member 23 having an H shape in section is constituted of a plate spring body 23*a*, and first and second connection portions 23*b* and 23*c* connected to both ends of the plate spring body 23*a*. The first connection portion 23*b* is inserted into/engaged with the engaging groove 22*h* of the lever body 22. The second connection portion 23*c* is inserted into/engaged with the engaging groove 24*h* of the fixture 24. While this engagement may be made only mechanically, adhesive may be used together.

In such a manner as described above, the lever body 22 is connected to the fixture 24 fixed to the base 5 by the plate spring member 23. Accordingly, upon receiving an impact, the inertia lever 21 is bent at a portion of the plate spring body 23*a* of the plate spring member 23, and thus can perform the swing operation in a direction shown by arrows of FIG. 7(*a*). When an impact is not applied, the plate spring body 23*a* is straight.

The first connection portion 23*b* is tightly inserted into/engaged with the engaging groove 22*h* of the lever body 22. The second connection portion 23*c* is tightly inserted into/engaged with the engaging groove 24*h* of the fixture 24. In addition, the plate spring body 23*a* is disposed in the direction of solely bending to the direction of the swing operation, and therefore, the operation of the lever body 22 to the direction perpendicular to the bending direction is restricted and controlled.

Note that, in this embodiment, the inertial moment of the lever body 22, which is caused by the bending of the plate spring body 23*a*, is larger than the inertial moment of the latch lever 25 around the swing shaft 26.

As shown in FIG. 4, the latch lever 25 has a latch arm 27 and an assist arm 28 around the swing shaft 26. In the latch arm 27, a latch protrusion 27*a* is formed. The latch protrusion 27*a* engages with a tip 72*a* of the coil arm 72 of the actuator 7 to latch the actuator 7 when the latch lever 25 moves to the actuator latching position. There are two points of application 28*a* (first point of application) and 28*b* (second point of application) in the assist arm 28. The point of application 28*a* is disposed in a push-down pin 29, and the point of application 28*b* is disposed in a push-up arm 30. The push-down pin 29 and the push-up arm 30 are formed on the assist arm 28.

The point of application 22*a* of the lever body 22 acts on the point of application 28*a* of the assist arm 28. The point of application 22*b* of the inertia lever 21 acts on the point of application 28*b* of the assist arm 28. The latch lever 25 performs the swing operation by external force caused by these actions.

Incidentally, when the hard disk drive 100 stops operating, the unillustrated control unit flows a drive current to the voice coil 81 of the VCM 8, and allows the head arm 71 of the actuator 7 to be unloaded to the escape position. Moreover, when the hard disk drive 100 starts operating, the unillustrated control unit allows the head arm 71 to be loaded from the escape position, allows the head slider 6 to be moved above the surface of the magnetic disk 1 starting the rotary operation, and further allows the head slider 6 to be moved on a desired data track based on servo data read out of the head elements of the head slider 6. FIG. 2 shows a state where the head arm 71 is unloaded to the escape position.

During non-operation of the hard disk drive 100, the head arm 71 of the actuator 7 and the head slider 6 are unloaded to the escape position. When the head arm 71 is located at the escape position, the tab 74 of the suspension arm 71*b* is held by the ramp block 10 as shown in FIG. 3. In this case, the magnetic disk 1 stays still.

When the head arm 71 is unloaded to the escape position, and the tab 74 is held by the ramp block 10, the ramp block 10 has a function as an actuator holding mechanism, which prevents the head arm 71 from moving from the escape position to the magnetic disk 1 side or a side opposite thereto for a weak impact not to operate the inertia latch mechanism 11, and hold the head arm 71 in the escape position.

Next, description will be made for a latching operation of the actuator 7 when an impact is applied to the hard disk drive 100 during non-operation. In this case, the inertia latch mechanism 11 operates as below, latches the actuator 7, and prevents the head arm 71 and the head slider 6 from entering the disposing space of the magnetic disk 1.

Description will be made for an operation of the inertia latch mechanism 11 with reference to FIGS. 4 to 6. FIG. 4 is a schematic view showing a positional relationship among the actuator 7, the inertia lever 21 and the latch lever 25 when the latch lever 25 is located at the actuator release position. In FIG. 4, the latch protrusion 27*a* of the latch lever 25 is located at a position separate from the swing orbit of the tip 72*a* of the coil arm 72.

Figure 5:
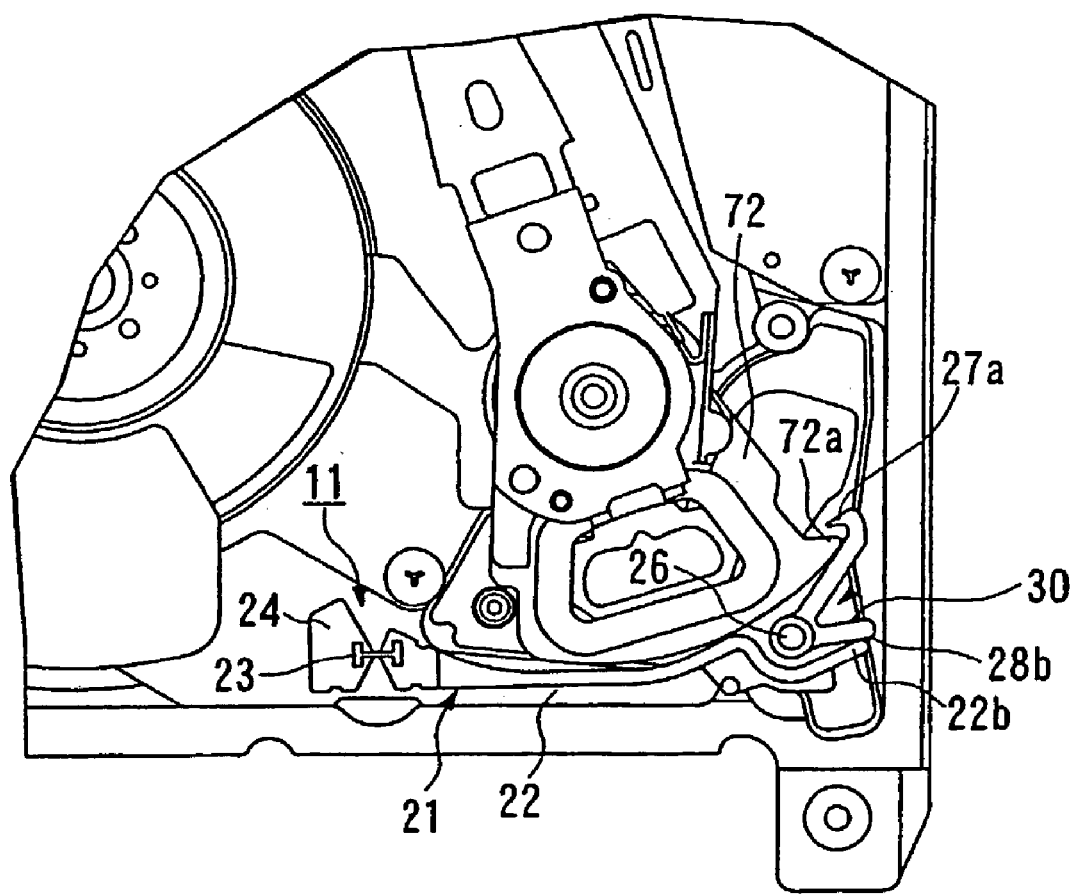
FIG. 5 is a partial plan view showing the vicinity of the inertia latch mechanism of the hard disk drive according to the embodiment, showing a state where an inertia lever swings counterclockwise because an impact is applied.

FIG. 5 is a view showing a latching operation in the case where a torque Tc1 swinging the actuator 7 counterclockwise acts thereon by an impact from the outside. When the torque Tc1 acts on the actuator 7, a torque Ti1 rotating the lever body 22 counterclockwise around the plate spring body 23*a* acts thereon. Moreover, on the latch lever 25, there acts a torque Tt1 rotating the latch lever 25 counterclockwise around the swing shaft 26 by the above-described impact. Furthermore, on the latch lever 25, there always acts a torque Ts rotating the latch lever 25 clockwise by, for example, a spring (not shown). If the torque Ti1 acting on the lever body 22 is larger than the torque Tt1+Ts acting on the latch lever 25, then the lever body 22 swings counterclockwise irrespective of the direction of the torque acting on the latch lever 25. Then, the point of application 22b pushes up the point of application 28b of the push-up arm 30, and swings the latch lever 25 counterclockwise. Thus, the latch lever 25 moves to the actuator latching position, and the latch protrusion 27a moves from the release position (state in FIG. 4) to the latching position on the swing orbit of the tip 72a of the coil arm 72 (state of FIG. 5). The latch protrusion 27a having moved to the latching position engages with the tip 72a of the coil arm 72 having moved from the escape position, hooks the tip 72a of the coil arm 72, and thus latches the actuator 7.

It is desirable that, thereafter, the latched actuator 7 be rapidly released from the inertia latch mechanism 11 and return to the escape position.

Figure 6:
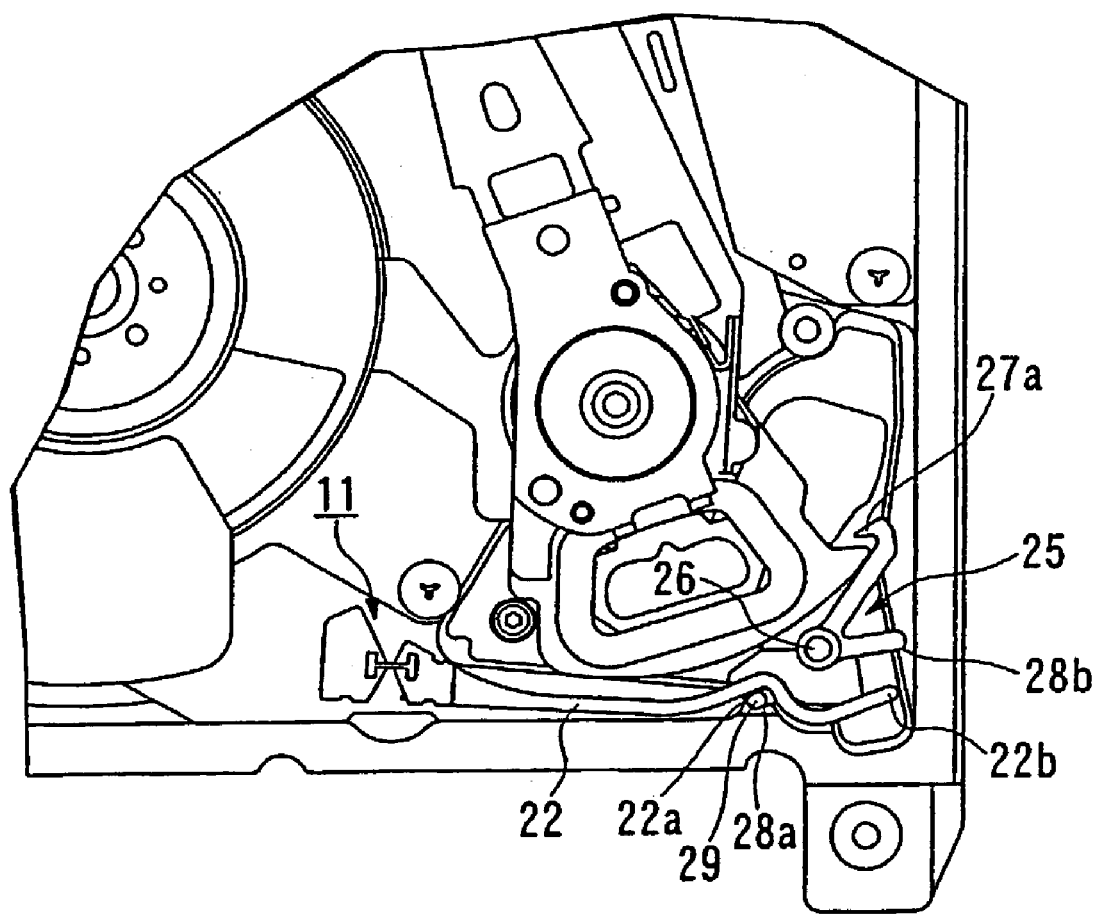
FIG. 6 is a partial plan view showing the vicinity of the inertia latch mechanism of the hard disk drive according to the embodiment, showing a state where the inertia lever swings clockwise because an impact is applied.

FIG. 6 is a view showing a latching operation in the case where a torque Tc2 swinging the actuator 7 counter clockwise acts thereon by an impact from the outside. When the torque Tc2 by the impact acts on the actuator 7, a torque Ti2 rotating the lever body 22 clockwise around the plate spring body 23a acts thereon. Moreover, on the latch lever 25, there acts a torque Tt2 rotating the latch lever 25 clockwise around the swing shaft 26 by the above-described impact. If the torque Ti2 acting on the lever body 22 is larger than the torque acting on the latch lever 25 (torque Tt1+Ts), then the lever body 22 overcomes the clockwise torque acting on the latch lever 25, and swings counterclockwise. Then, the point of application 22a pushes down the point of application 28a of the push-down pin 29, and swings the latch lever 25 counterclockwise. Thus, the latch lever 25 moves to the actuator latching position, and the latch protrusion 27a moves to the latching position on the swing orbit of the tip 72a of the coil arm 72, and hooks the tip 72a of the coil arm 72.

As described above, the lever body 22 is controlled in swing operation by the spring force, and has the two points of application 22a and 22b disposed spaced by a specified interval. Meanwhile, in the latch lever 25, the point of application 28a present in the push-down pin 29 is formed on the surface (first surface) facing the actuator 7. Moreover, the point of application 28b present in the push-down arm 30 is formed on the second surface opposite to the first surface. Then, one point of application 22a of the lever body 22 acts on the point of application 28a formed on the first surface of the latch lever 25, and thus the lever 25 swings clockwise. Moreover, the other point of application 22b of the lever body 22 acts on the points of application 28b formed on the second surface of the latch lever 25, and thus the latch lever 25 swings counterclockwise.

In each of FIGS. 5 and 6, in order to swing the lever body 22 in each direction of the torques Ti1 and Ti2 by the impact, each of the torques Ti1 and Ti2 must be larger than each of the torques Tt1 and Tt2 acting on the latch lever 25 by the impact. Specifically, since it is conceived that impact angular accelerations acting on the lever body 22 and the latch lever 25 are approximately equal to each other, the inertial moment of the lever body 22 must be larger than the inertial moment of the latch lever 25. Note that a swing distance of the latch protrusion 27a from the release position to the latching position, a position of the latching point, a distance from the latch protrusion 27a to the swing shaft 26 and the like are set in advance so that the latch protrusion 27a can move to the latching position before the tip 72a of the coil arm 72 moves from the escape position to the latching position.

According to the inertia latch mechanism 11 in accordance with this embodiment, the inertia lever 21 is constituted of the lever body 22, the plate spring member 23 and the fixture 24, and thus it is not necessary to erect the pin for constituting the swing shaft 26 as before. Moreover, the lever body 22 is connected to the plate spring member 23 by the fixture 24, and this connection structure can substantially prevent the vibrations of the lever body 22 in the vertical direction. This is because the plate spring body 23a is disposed in the following manner. Specifically, while the flexure of the plate spring body 23a in the swing direction of the lever body 22 is permitted, the flexure in the direction perpendicular to the above-described swing direction is substantially limited. Accordingly, the occurrence possibility of contamination is reduced, which is caused by the collision of the lever body 22 with the top cover 14 or the base 5 when the hard disk drive 100 receives an impact. Note that, while the latch lever 25 has the swing shaft 26 composed of the pin, the movement thereof in the vertical direction is restricted by the lever body 22.

Moreover, according to the inertia latch mechanism 11 in accordance with this embodiment, the lever body 22 having a larger inertial moment than that of the latch lever 25 is provided, and thus the reliabilities of the inertia latch mechanism 11 and the actuator lock mechanism can be improved. Furthermore, the lever body 22 can be fabricated by use of a press, and the latch lever 25 can be fabricated by use of a thin member such as a plastic mold. Furthermore, the lever body 22 and the latch lever 25 can be disposed to have approximately the same height. Therefore, the inertia latch mechanism 11 can be mounted on a hard disk drive 100 fabricated to be thin.

Note that, in the actuator lock mechanism using the inertia latch mechanism 11, the actuator holding mechanism is not limited to the ramp block 10, and a magnetic lock mechanism or the like may be used.

Moreover, the inertia latch mechanism 11 can be applied to a hard disk drive 100 of a contact start/stop (CSS) type, in which the ramp block 10 is not provided, a specified concentric circle-shaped area on the surface of the magnetic disk 1 is set as an escape area (escape position), and the head slider 6 is landed on this escape area. However, in this case, it is necessary to use together an actuator holding mechanism (for example, a magnetic lock mechanism) replacing the ramp block 10. Furthermore, the above-described inertia latch mechanism 11 can be applied not only to the hard disk drive 100, in which the magnetic disk 1 is fixed to the base 5, but also to a hard disk drive 100 of a removable type, which is capable of detaching a disk.

Moreover, in the above-described inertia latch mechanism 11, the engaging mechanism of the lever body 22 and the latch lever 25, and the engaging mechanism of the latch lever 25 and the tip 72a of the coil arm 72 of the actuator 7 are not limited to the ones described above. Furthermore, the portion of the actuator 7, which the inertia latch mechanism 11 latches, is not limited to the tip 72a of the coil arm 72.

Figure 8:
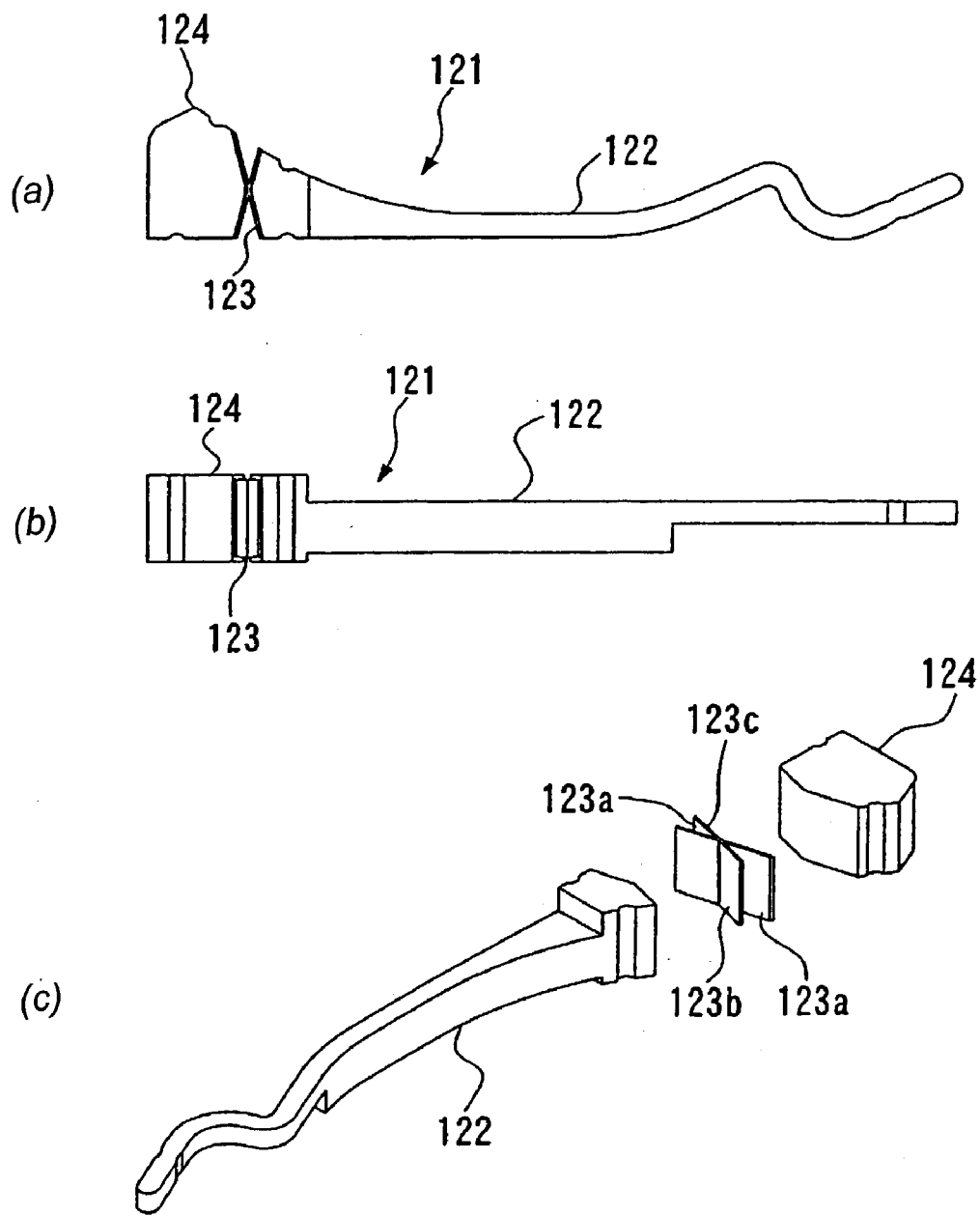
FIGS. 8(*a*), (*b*), and (*c*) are plan, side, and exploded perspective views, respectively, showing another form of the inertia lever.
Figure 9:
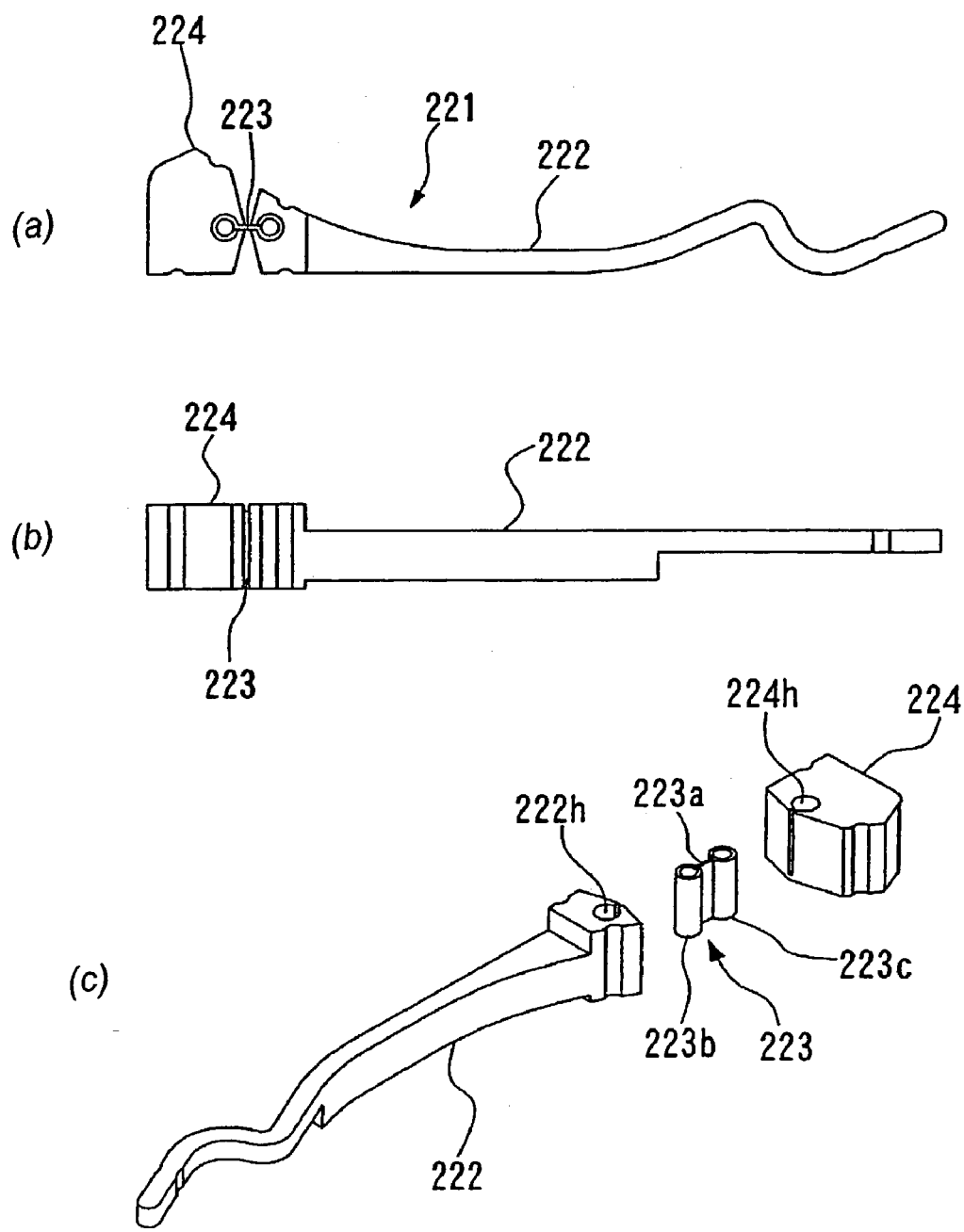
FIGS. 9(*a*), (*b*), and (*c*) are plan, side, and exploded perspective views, respectively, showing still another form of the inertia lever.

Furthermore, in the present invention, the inertia lever 21 is not limited to the form shown in FIG. 7, and for example, may be in a form shown in FIG. 8 or 9. An inertia lever 121 shown in FIGS. 8(a), (b), and (c), has a plate spring member 123, in which plate spring bodies 123a are intercrossed in an X shape. In the plate spring member 123, a connection surface 123b is jointed to a lever body 122 by adhesive, and a connection surface 123c is jointed to a fixture 124 by adhesive.

Moreover, in FIGS. 9(a), (b), and (c), a plate spring member 223 has connection portions 223b and 223c formed by rolling both ends of a plate spring body 223a. Meanwhile, an engaging groove 222h for engaging the connection portion 223b is formed in a lever body 222, and an engaging groove 224h for engaging the connection portion 223c is formed in a fixture 224. The connection portion 223b engages with the engaging groove 222h, and the connection portion 223c engages with the engaging groove 224h, and thus the lever body 222 is connected to the fixture 224 so as to be capable of swinging.

As described above, according to the present invention, the inertia latch mechanism can be provided, which is capable of omitting the erection of the pin for swinging the inertia lever. Moreover, the present invention provides the hard disk drive and the actuator lock mechanism, which are provided with the inertia latch mechanism as described above.

Although the preferred embodiments of the present invention have been described in detail, it should be understood that various changes, substitutions and alternations can be made therein without departing from spirit and scope of the inventions as defined by the appended claims.

What is claimed is:

1. A disk drive device comprising:
   a disk-shaped recording medium;
   a head slider including a head element for recording data in the disk-shaped recording medium and reading the recorded data;
   an actuator including a head arm having the head slider mounted thereon, the actuator being for unloading the head arm to an escape position and loading the head arm from the escape position so that the head slider is disposed close to a surface of the disk-shaped recording medium; and
   an inertia latch mechanism for latching and stopping the actuator in the escape position when an impact is applied thereto in a state where the actuator is located in the escape position,
   wherein the inertia latch mechanism includes:
   a latch member capable of swinging between a release position of the actuator and a latching position of the actuator around a specified swing shaft, the latch member moving from the release position of the actuator to the latching position thereof to latch the actuator when the impact is applied thereto;
   an inertia member swinging by inertial force of the impact to move the latch member when the impact is applied thereto, such that the inertia member is free of contact with the actuator;
   a fixed member fixed at a specified position of the disk drive device; and
   a swing permitting member for permitting the swing of the inertia member, the swing permitting member being interposed between the fixed member and the inertia member.

2. An actuator lock mechanism comprising:
   an inertia latch mechanism for latching and stopping a rotary actuator in an escape position when an impact is applied thereto in a state where the rotary actuator is located in the escape position; and
   an actuator holding mechanism for holding the rotary actuator in the escape position for an impact insufficient for the latching by the inertia latch mechanism,
   wherein the inertia latch mechanism includes:
   an inertia lever swinging by receiving inertial force by the impact, the inertia lever being free of contact with the rotary actuator but engaging the rotary actuator via the actuator holding mechanism;
   a latch lever for latching and stopping the rotary actuator in the escape position accompanied with an operation of the inertia lever; and
   a regulating member for permitting swing of the inertia lever but regulating the operation of the inertia lever to directions other than a swing direction.

3. The actuator lock mechanism according to claim 2, wherein the regulating member is constituted of a plate-shaped body disposed so that rigidity thereof in the swing direction becomes larger than rigidity thereof in a direction perpendicular to the swing direction, and the regulating member providing a pivot point for the inertia lever.

4. The actuator lock mechanism according to claim 2, wherein the latch lever can swing around a specified swing shaft, and has a first point of application and a second point of application, the first and second points of application being disposed to bridge the swing shaft, and
   the inertia lever has a third point of application and a fourth point of application, the third and fourth points of application being disposed to bridge the swing shaft of the latch lever, the latch lever swings to a specified direction when the third point of application contacts the first point of application of the latch lever and first external force acts on the first point of application, and the latch lever swings to the specified direction when the fourth point of application contacts the second point of application of the latch lever and second external force acts on the second point of application.

5. An inertia latch mechanism disposed in a case of a disk drive device, in which a rotary actuator is latched and stopped in an escape position when an impact is applied thereto in a state where the rotary actuator is located in the escape position,
   the inertia latch mechanism comprising:
   an inertia lever swinging by receiving specified inertial force by the impact; and
   a latch lever for making direct contact with the rotary actuator, and latching and stopping the rotary actuator in the escape position in a process of swinging around a swing shaft accompanied with an operation of the inertia lever,
   wherein a swing operation of the inertia lever is controlled by spring force, and the inertia lever has two points of application, the two points of application being disposed spaced from each other by a specified interval, the inertia lever being free of contact with the rotary actuator and only making contact with the rotary actuator via the latch lever,
   the latch lever has a first surface facing to the rotary actuator and a second surface opposite to the first surface,
   one of the points of application of the inertia lever acts on the first surface of the latch lever to swing the latch lever to a specified direction, and
   the other of the points of application of the inertia lever acts on the second surface of the latch lever to swing the latch lever to the specified direction.

6. The inertia latch mechanism according to claim 5, wherein the inertia latch mechanism is provided with a cantilevered plate spring disposed to be bent solely in a direction of the swing operation of the inertia lever, and the inertia lever is connected to and also cantilevered with respect to the plate spring to control the swing operation of the inertia lever.

7. The inertia latch mechanism according to claim 6, wherein the plate spring keeps a straight state when the impact is not applied thereto to maintain the inertia lever at a specified position, and the plate spring is bent when the impact is applied thereto to permit the swing of the inertia lever.

8. An inertia lever disposed in a case of a disk drive device and used for an inertia latch mechanism for latching and stopping a rotary actuator in an escape position when an impact is applied thereto in a state where the rotary actuator is located in the escape position, the inertia lever comprising:
a lever body swinging by inertia of the impact when the impact is applied thereto;
a fixture fixed to the case; and
a swing permitting member for connecting the lever body and the fixture and permitting the swing of the lever body, such that the swing permitting member is located between the fixture and the lever body to cantilever the body with respect to the fixture.

9. The inertia lever according to claim 8, wherein the swing permitting member is constituted of a plate spring member.

10. The inertia lever according to claim 9, wherein the plate spring member includes:

a spring body having a portion bent during the swing of the lever body;
a first connection portion continuous with the spring body and for connecting the spring body and the lever body; and
a second connection portion continuous with the spring body and for connecting the spring body and the fixture.

11. The inertia lever according to claim 10, wherein first and second engaging portions are formed in the lever body and the fixture, respectively, the first connection portion of the plate spring member engages with the first engaging portion, the second connection portion of the plate spring member engages with the second engaging portion, and the lever body and the fixture are connected by the plate spring member.

* * * * *